United States Patent [19]

Matsuura et al.

[11] Patent Number: 5,343,402
[45] Date of Patent: Aug. 30, 1994

[54] NON-CONTACT DIGITIZING CONTROL UNIT

[75] Inventors: Hitoshi Matsuura, Hachiouji; Eiji Matsumoto, Yamanashi, both of Japan

[73] Assignee: Fanuc Ltd., Yamanashi, Japan

[21] Appl. No.: 930,533

[22] PCT Filed: Feb. 6, 1992

[86] PCT No.: PCT/JP92/00122

§ 371 Date: Oct. 2, 1992

§ 102(e) Date: Oct. 2, 1992

[87] PCT Pub. No.: WO92/13677

PCT Pub. Date: Aug. 19, 1992

[30] Foreign Application Priority Data

Feb. 6, 1991 [JP] Japan ............... 3-36897

[51] Int. Cl.$^5$ ............... G06F 15/46; B23Q 35/127; G01B 21/20
[52] U.S. Cl. ............... 364/474.03; 364/474.37; 318/577; 318/578; 318/579
[58] Field of Search ............... 364/474.03, 474.05, 364/474.37, 474.29; 318/570, 577, 578, 579

[56] References Cited

U.S. PATENT DOCUMENTS

| | | | |
|---|---|---|---|
| 4,962,460 | 10/1990 | Matsuura | 364/474.03 |
| 5,067,086 | 11/1991 | Yamazaki et al. | 364/474.08 |
| 5,140,239 | 8/1992 | Matsuura | 318/577 |
| 5,182,714 | 1/1993 | Matsuura | 364/474.03 |
| 5,241,485 | 8/1993 | Matsuura | 364/474.03 |
| 5,274,563 | 12/1993 | Matsuura et al. | 364/474.03 |

FOREIGN PATENT DOCUMENTS

| | | |
|---|---|---|
| 0313801 | 5/1989 | European Pat. Off. . |
| 0520075A1 | 12/1992 | European Pat. Off. . |
| 61-274852 | 12/1985 | Japan . |
| 64-64753 | 3/1989 | Japan . |
| 1-109058 | 4/1989 | Japan . |
| 1-188254 | 7/1989 | Japan . |
| 3-121754 | 5/1991 | Japan . |
| WO90/14924 | 12/1990 | PCT Int'l Appl. . |
| WO91/01849 | 2/1991 | PCT Int'l Appl. . |
| WO91/08861 | 6/1991 | PCT Int'l Appl. . |
| WO92/01534 | 2/1992 | PCT Int'l Appl. . |
| WO92/04157 | 3/1992 | PCT Int'l Appl. . |

*Primary Examiner*—Paul Gordon
*Attorney, Agent, or Firm*—Nikaido, Marmelstein, Murray & Oram

[57] ABSTRACT

The purpose of the invention is to carry out the most appropriate attitude control of non-contact distance detectors (5a, b) onto the tracer model (6) surface and provide a digitizing control unit with high accuracy. A non-contact distance detecting device (105) samples coordinates of a plurality of points from the model surface, and the coordinates are stored in a memory (101). A point selecting device (102) selects 3 points on the tracer model surface composing a triangle most similar to a regular triangle after selecting 3 arbitrary points of the stored coordinates. A vector determining device (103) determines the normal vector with reference to the coordinates of the 3 selected points. The attitude of the non-contact distance detecting device (105) is controlled by the attitude control device (104) using the normal vector.

9 Claims, 7 Drawing Sheets

Fig. 5 tracing direction ⟶

Fig.9

NON-CONTACT DIGITIZING CONTROL UNIT

TECHNICAL FIELD

The present invention relates to a tracer control unit, more particularly it relates to a digitizing control unit.

BACKGROUND ART

A non-contact digitizing control unit and a non-contact tracer control unit that trace a model surface and machine a material so that a contour is identical to that of the model by using non-contact distance detectors have been developed recently. In this case, optical distance detectors are utilized as non-contact distance detectors, which are fixed at the top of a tracer head, measure the distances to the model surface and calculate digitizing data; then the digitizing control unit machines after completion of the model surface tracing, while the tracer control unit simultaneously traces and machines by a cutter associated with the tracer head. Such machinings by the non-contact digitizing control unit or the tracer control unit are expected in the development of applications in the tracing and machining fields because a soft surface model can be used because no cautionary measures are taken to avoid damaging the model.

Figure 1:
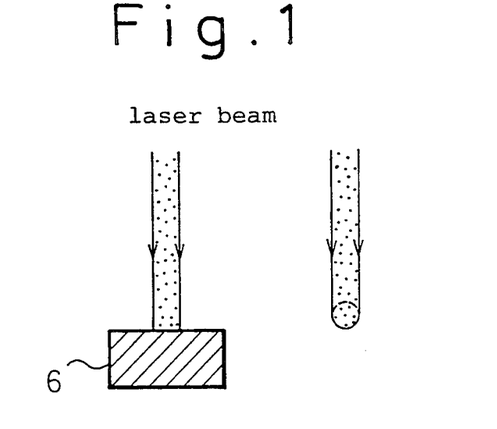
FIG. 1 is an explanatory drawing illustrating a laser beam from an optical distance detector illuminated normal to a model surface.
Figure 2:
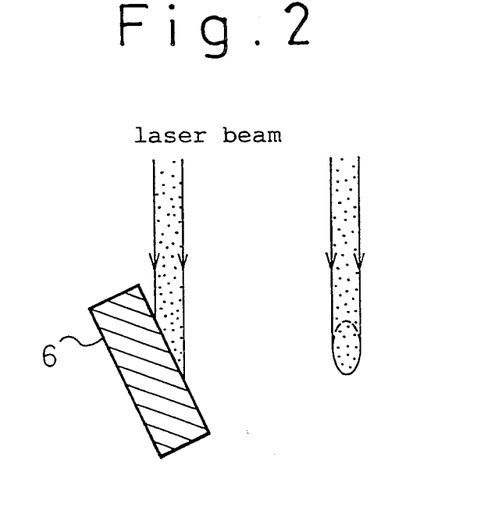
FIG. 2 is an explanatory drawing illustrating the laser beam illuminated oblique to the surface.
Figure 3:
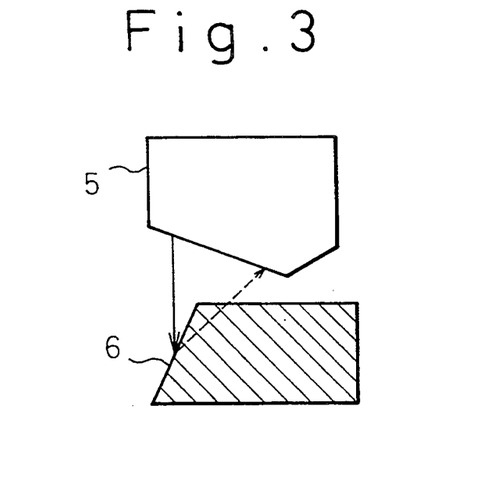
FIG. 3 is an explanatory drawing illustrating the scattered or reflected lights intercepted by the model.

FIG. 1 is an explanatory drawing illustrating a laser beam from an optical distance detector, illuminated normal to a model surface, FIG. 2 is an explanatory drawing illustrating a laser beam illuminated oblique to the model surface, and FIG. 3 is an explanatory drawing illustrating scattered or reflected lights intercepted by the model.

In the non-contact digitizing control units of the prior art, there is a problem in that the accuracy of tracing and machining is reduced at the area where the slope angle of a model surface to the X-Y plane is large, because the distance to the model surface is measured from a determined direction to the model, e.g., Z-axis normal to the table surface (X-Y surface) on which the model is installed. That is, an optical measuring axis of the distance detector becomes oblique to the model surface in this area, therefore the spot light on the model surface is enlarged in the form of an ellipse, reduces the resolution of the detector, and decreases the tracing accuracy. This means the position of the image cannot be determined and the accuracy of the obtained distance data will be decreased when the image on the light sensing element becomes large, because the distance to the model surface can be obtained by converting the current into the distance; the current of which is generated because of the position of the image formed on the light sensing element of the optical distance detector.

The image on the light sensing element is the image formation of an optical spot on the model surface by means of an image formation lens, so that the image on the light sensing element also becomes large if an optical spot has a large area. The illuminated laser beam is normally not a beam but an optical bundle, therefore an optical spot on the model surface has a surface area, and because of that, the optical spot is a circle and is most appropriate when the model surface is nominal to an illumination measure shaft as shown in FIG. 1, while the optical spot is enlarged to an ellipse and the measuring accuracy is reduced when the model surface is oblique in relation to the illumination measure shaft as shown in FIG. 2.

Particularly, in the case of a distance detector by means of the triangulation method, the distance often cannot be measured because of an interference between the optical measuring axis and the model surface, and because of the interception of the reflection from an optical spot and scattered lights when the model angle becomes large as shown FIG. 3.

For this reason a method that comprises using 2 detectors simultaneously executing a plurality of measurements by a tracer head, selecting 3 arbitrary points, determining the normal vector of a model surface by these 3 points, rotating the distance detector to the direction of the normal vector, and improving the measuring accuracy can be considered. Japanese Patent Application No. 1-194500 is an example of this kind of non-contact tracer control unit.

According to the apparatus described, a tracer control unit capable of high accuracy distance measurements can be provided by a method that comprises obtaining each coordinate of each apex of a small square on the model surface from measured data previously and currently sampled when transferring along the tracing line of 2 non-contact distance detectors provided with the tracer head, determining the nominal vector by using the coordinates of 3 desired apexes among them, rotating the tracer head in the direction of projection (shadow) to the X-Y plane of the normal vector and, directing the measuring shaft of the non-contact distance detector to be as close to normal to the model surface as possible.

However, with the above mentioned apparatus, there are cases in which 3 points are on a direct line or nearly equal to the direct line when 3 points are arbitrarily selected among a plurality of points, so that the normal vector of a model surface cannot be accurately obtained. Namely, the nominal vector cannot be obtained when 3 points are on a direct line. Furthermore, as the surface curve change rates of the surface model become large when 3 points are nearly equal to the direct line, an approximate plane of the model surface far from the real model surface is obtained. Therefore, the attitude control of the distance detector is performed based on the inaccurate normal vector, so that there remains a problem in that a reduction in the accuracy of a tracing cannot be avoided.

DISCLOSURE OF THE INVENTION

Accordingly, it is an object of the present invention to provide a non-contact digitizing control unit that can select the points to determine an accurate nominal vector on the model surface.

According to the present invention to solve the above described problems, a non-contact digitizing control unit is provided that obtains tracing data by sampling coordinates of a plurality of points from a model surface by means of a non-contact distance detector; the attitude of the detector is controlled to select a direction most suitable to the model surface, characterized in that it comprises a memory means for storing coordinates of a plurality of sampled points, a point selecting means for selecting 3 points so as to compose a triangle most similar to a regular triangle from the 3 arbitrary points in said coordinates, a vector determining means for determining the normal vector on the model surface based on 3 points of the coordinates selected by the point selecting means, an attitude control means for directing the attitude of said non-contact distance detecting means to the normal vector of model surface based on the determined normal vector.

The digitizing control unit according to the present invention determines the nominal vector by means of the vector determining means after selecting the 3 arbitrary points from coordinates of a plurality of sampled points by the non-contact distance detecting means. At this time a triangle composed of 3 points is selected from the 3 points so as to compose the most similar regular triangle. The attitude of the non-contact detector is controlled to direct the measuring shaft to be as close to normal the model surface as possible based on the determined nominal vector, and as a result accurate tracing data can be obtained.

BEST MODE FOR CARRYING OUT THE INVENTION

One of the embodiments of the present invention will be explained hereinafter, referring to the attached drawings.

Figure 4:
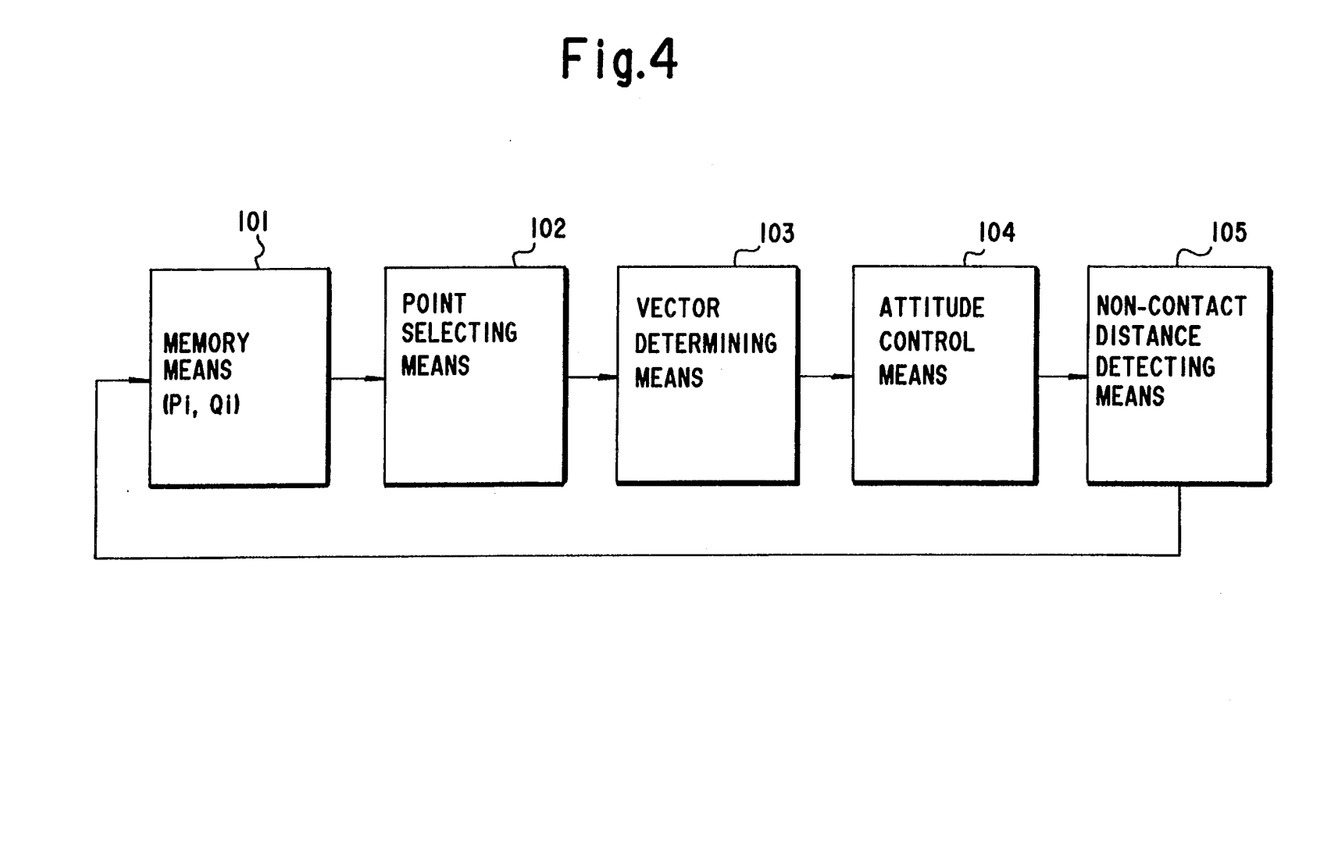
FIG. 4 is a general block diagram of the non-contact digitizing control unit according to the present invention.

FIG. 4 is a general block diagram of the non-contact digitizing control unit according to the present invention. In a memory means 101, data of coordinates of a plurality of points (Pi, Qi) sampled from the model surface by means of 2 detectors of non-contact distance detecting means 105 are stored as data for tracing and attitude control. A point selecting means 102 is provided for selecting 3 arbitrary points of tracing data, and in the unit according to the present invention, the 3 points are selected so as to compose a triangle to be most similar to a regular triangle.

A vector determining means 103 is provided for determining the nominal vector on the model surface based on the coordinates of the 3 selected points. An attitude control means 104 is provided, for example, with the 2 detectors associated therewith having a 45° slope to the rotation shaft of the tracer head, and controls the attitude of a non-contact distance detecting means 105 by rotating the rotating axis of the tracer head.

That is, the non-contact distance detecting means 105 is rotated around the axis by means of the attitude control means 104 in accord with the direction of a projection on the model installed plane to the determined normal vector. The measurement axis of the 2 detectors of the non-contact distance detecting means 105 is controlled to direct the attitude to be as close to nodal to the model surface, as possible and accurate tracing data can be obtained. The tracing data of the model contour are stored in the memory means 101.

Figure 5:
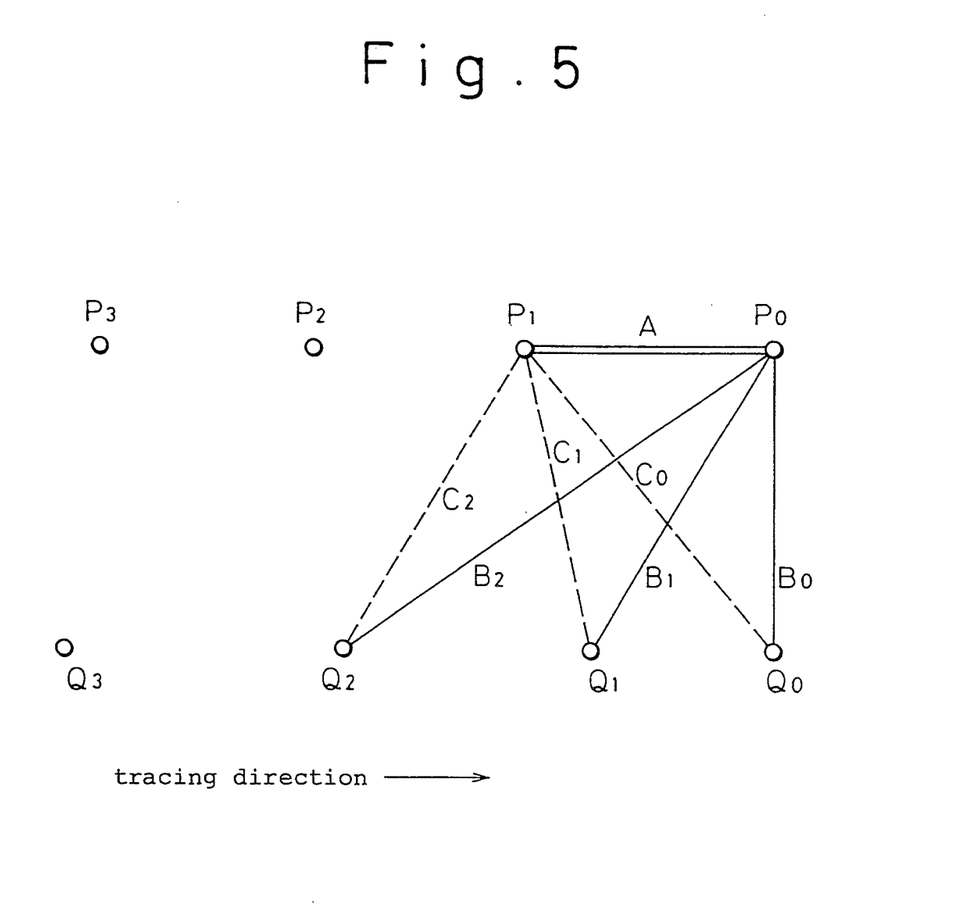
FIG. 5 is a drawing illustrating the position relationship of a plurality of sampled points from the surface model.

FIG. 5 illustrates the relationship of the position of 4 sets of points sampled from the model surface by the above mentioned means 105 such as ($P_0$, $Q_0$), ($P_1$, $Q_1$), ($P_2$, $Q_2$) and ($P_3$, $Q_3$). Assuming the current tracing point as ($P_0$, $Q_0$), those points ($P_1$, $Q_1$), ($P_2$, $Q_2$) and ($P_3$, $Q_3$) are tracing points respectively at the previous sampling time. Namely, now the tracing can be assumed to have proceeded from left to right in FIG. 5, the coordinate data of 2 points ($P_i$, $Q_i$) sampled simultaneously from the model surface are stored as tracer data and attitude control data in the memory means 101. After defining the point $P_i$ as a point is sampled by the detector (main detector) used for tracing control among 2 detectors, the above mentioned selecting means 102 selects the current measurement point $P_0$ as one of the apexes of a triangle. Furthermore when the remaining 2 points are selected from points $Q_0$, $Q_1$, ... and $P_1$, $P_2$, ..., one point is determined as a sampling point $P_1$ that is an immediately preceding sampled point of the main detector, and the other point is selected among the 3 measurement points $Q_0$, $Q_1$ and $Q_2$ by the other detector by means of the determining algorithm described hereinafter.

Figure 6:
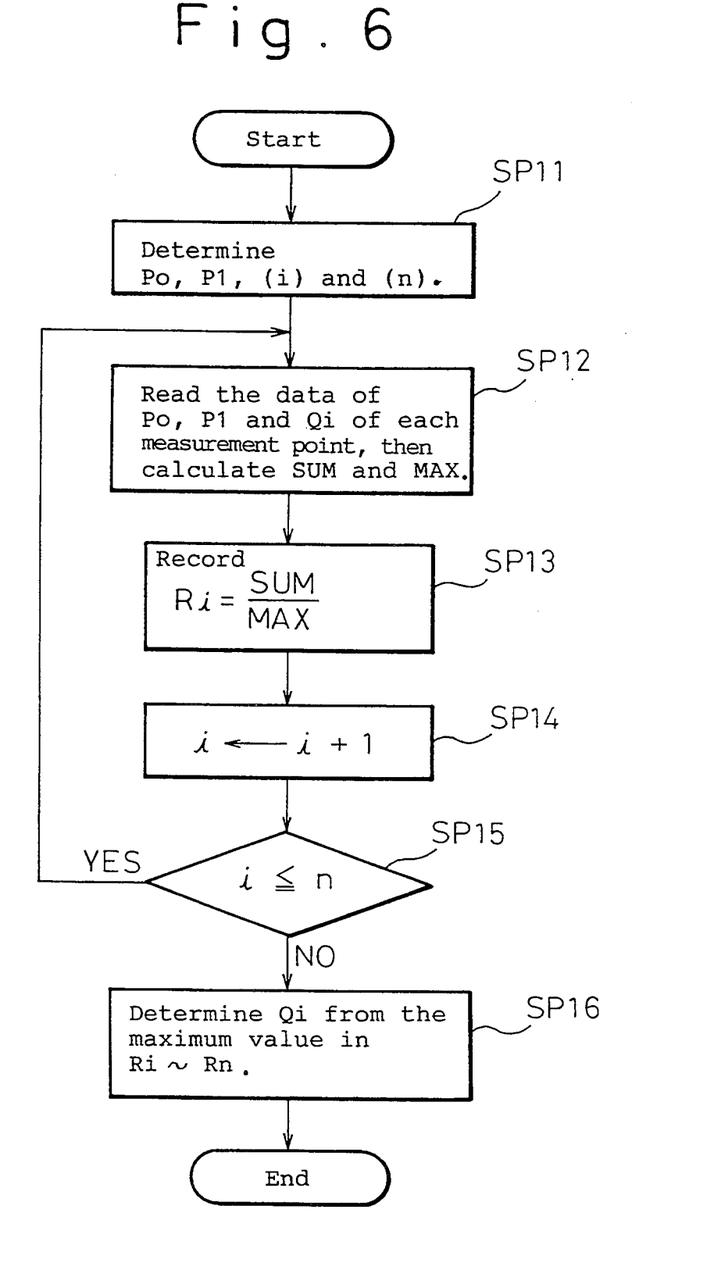
FIG. 6 is a flow chart indicating the procedure to determine the triangle.

FIG. 6 is a flow chart indicating the procedure to determine the other point among the measurement points $Q_0$, $Q_1$, - - - as an apex of the triangle composing the most similar regular triangle when the line segment from $P_0$ to $P_1$, which are measurement points by the main detector, is selected as a side of a triangle. In the drawing, the numbers following the reference SP denotes the stepping number.

(SP11) The original value (i) of the other point and the point number (n), as an objective point, as well as the measurement points $P_0$, $P_1$ are determined from the memory means 101. These values of (i) and (n) are determined as a trade off between the time required for calculation and tracer control accuracy.

That is, since the greater the increase in the number of objective points, the greater the increase in the number of comparisons, and therefore more appropriate points can be selected, and although accuracy increases, greater time consumption is required because of the necessity of a greater number of calculations for comparison. On the other hand, when the number of object points is decreased, the time for calculation is reduced but accuracy also decreases.

It goes without saying that it is necessary to determine the nominal vector so as to be in time for the sampling speed to the attitude control means 104. In the example of FIG. 5, the original value (i) is 0 and the objective point number (n) is 3.

(SP12) First read the data of $P_0$, $P_1$ and $Q_i$ of each measurement point, then calculate the sum (SUM) of 3 sides of each triangle formed from the above 3 points, and calculate the maximum length (MAX) of the above 3 sides. When $Q_0$ is selected in FIG. 5, SUM = $A + B_0 + C_0$ and MAX = $C_0$.

(SP13) Calculate the sum of 3 sides of a triangle, and calculate the ratio between the sum of 3 sides of a triangle and the maximum length of 3 sides of the triangle, and memorize the data of $R_i$ (= SUM/MAX).

(SP14) Calculate (i)=(i)+1, and set the data (i)+1 as the new data of (i).

(SP15) Compare (i) with (n), if (i) is not more than (n), return to step 12 and calculate the ratio of Ri repeatedly until (i) is more than (n).

(SP16) Finally determine the third point Qi from the maximum value of a plurality of the calculated ratio data Ri. In this way, 3 points can be determined so as to obtain the maximum ratio (SUM/MAX) between the sum of the length of the 3 sides of triangles and the length of the maximum side of the 3 sides of the triangle.

Figure 7:
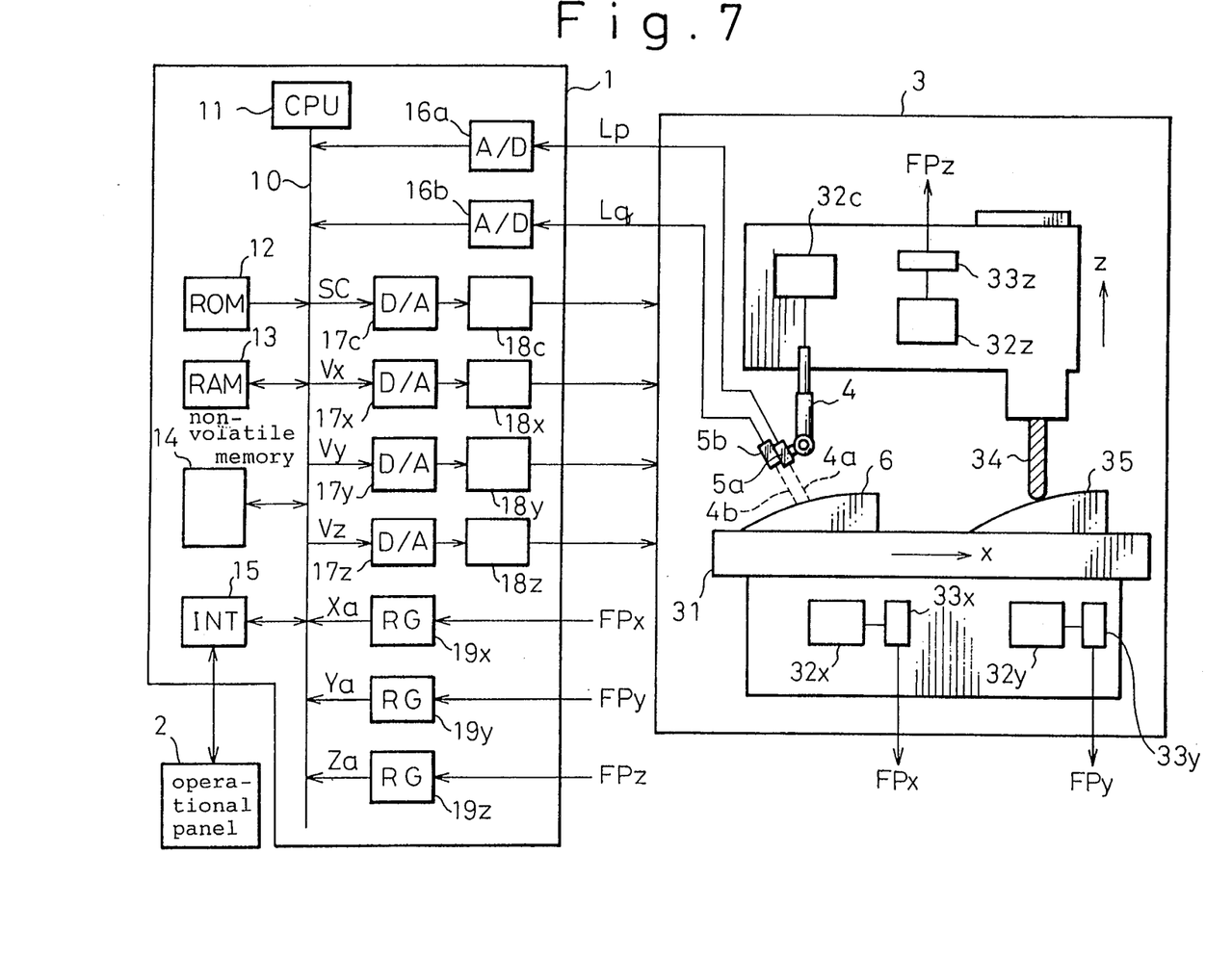
FIG. 7 is a block diagram of the non-contact digitizing control unit according to one of the embodiments of the present invention.

FIG. 7 is a block diagram of the non-contact digitizing control unit and the peripheral equipment according to one of the embodiments of the present invention. In the drawing, a processor 11 reads a system program stored in a ROM12 via a bus 10, and controls the general operations of a non-contact digitizing control unit 1 following the system program. RAM 13 is a data storage for storing the measured data from the distance detector that will be described hereinafter and the other temporary data. Non-volatile memory 14, not shown in the drawing is a battery back-up, stores the various parameters such as trace directions, trace speeds and so on, which are input from an operational panel 2 via an interface 15.

A tracer head 4 of a copy shaping machine 3 is provided with a distance detector 5a and a distance detector 5b. In a distance detector 5a and a distance detector 5b, semiconductor lasers or optical reflection type distance detectors with a photo-diode as a light source are used to measure the distances Lp and Lq, respectively, to the model 6 without contacting the model surface. These distances Lp and Lq are converted to a digital data value by an A/D converter 16a and 16b in the non-contact digitizing control unit 1, and are sequentially read by a processor 11.

The processor 11 calculates the transferred distance of each axis based on the distances Lp and Lq and the signals of the current position registers 19x, 19y and 19z described later, generate the velocity signals of each shaft such as Vx, Vy and Vz based on the transferred distance, commanded tracer direction signals and the commanded tracer velocity signals by known conventional arts. These velocity signals are converted into analog signals by each of the D/A converters such as 17x, 17y and 17z, and input to each of the servo-controllers 18x, 18y and 18z. The servo-controllers 18x and 18y drive servo-motors 32x and 32y in the copy shaping machine 3 based on the velocity signals, thereby a table 31 is transferred in an x-axis direction and y-axis direction that is nominal to the page and transferred back. And also the servo-controller 18z drives the servo-motor 32z and the tracer head 4 and the tool 34 are transferred in a z axis direction.

The servo motors 32x, 32y and 32z are provided with pulse encoders 33x, 33y and 33z to periodically generate detecting pulses FPx, FPy and FPz, respectively, every motor rotation. The current position registers 19x, 19y and 19z in the non-contact digitizing control unit 1 count up and down the detecting pulses FPx, FPy and FPz in the direction of the rotation, respectively, and calculate the current position data of Xa, Ya and Za and input the data to the processor 11.

On the other hand, the processor 11 periodically samples the data of the distances Lp and Lq measured by the distance detectors 5a and 5b with the determined sampling time and controls each of the above described axis, then calculates the normal vector to the surface of the model 6 from the selected triangle by the procedure previously described using the sampled data, and generates the rotation signal SC corresponding to the direction of the projection of the normal vector on the X-Y plane. After the rotation signal SC is converted from digital data to analog data by the D/A converter 17c, the signal is input to the servo-controller 18c and drives the C-axis of the servo-motor 32c based on the signal.

This controls the distance to the model 6 kept constant as described hereinafter and rotates the tracer head 4 to the commanded angle, at the same time the table 31 is transferred to the commanded trace direction with the trace speed, and a workpiece 35 may be machined with the same contour as the model 6 by a tool 34; the z-axis of which is controlled in the same way as the tracer head 4.

Figure 8:
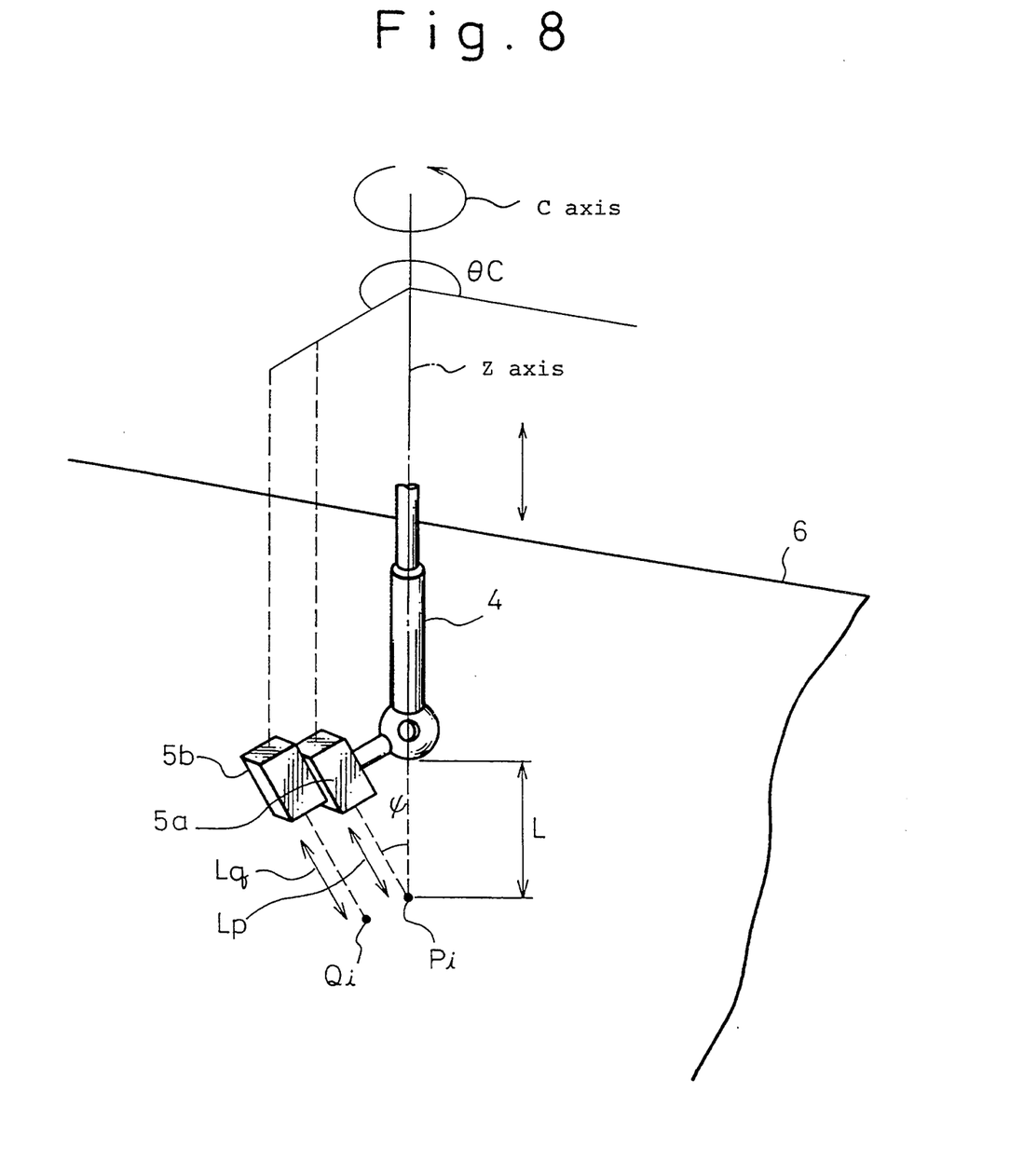
FIG. 8 is a detailed drawing illustrating the tracer head according to one of the embodiments of the present invention.

FIG. 8 is a detailed drawing illustrating the tracer head 4 according to one of the embodiments of the present invention. In FIG. 8, the tracer head 4 is provided with a distance detector 5a with the slope angle $\theta$ to the z-axis, and rotates around the C-axis with the determined radius in accordance with the rotation signal SC with the command angle $\theta c$. And also the distance detector 5b is laid and mounted outside of the associated distance detector 5a, and controls the rotation with the command angle $\theta c$ along with the distance detector 5a.

As previously described, due to the fact that the measured values of the distance detector 5a is fedback to the tracer control unit, the distance Lp from the detector 5a to the measurement point Pi on the model 6 is kept constant. Furthermore the distance Lp is set as the distance to the cross point between the measured axis and the z-axis and although the tracer head is rotated around the C-axis, the measurement point Pi does not move, and therefore the distance L between the tracer head 4 and model 6 is also kept constant.

The distance detector 5b measures the distance Lq to the measurement point Qi on the model 6 and inputs the data to the tracer control unit.

Figure 9:
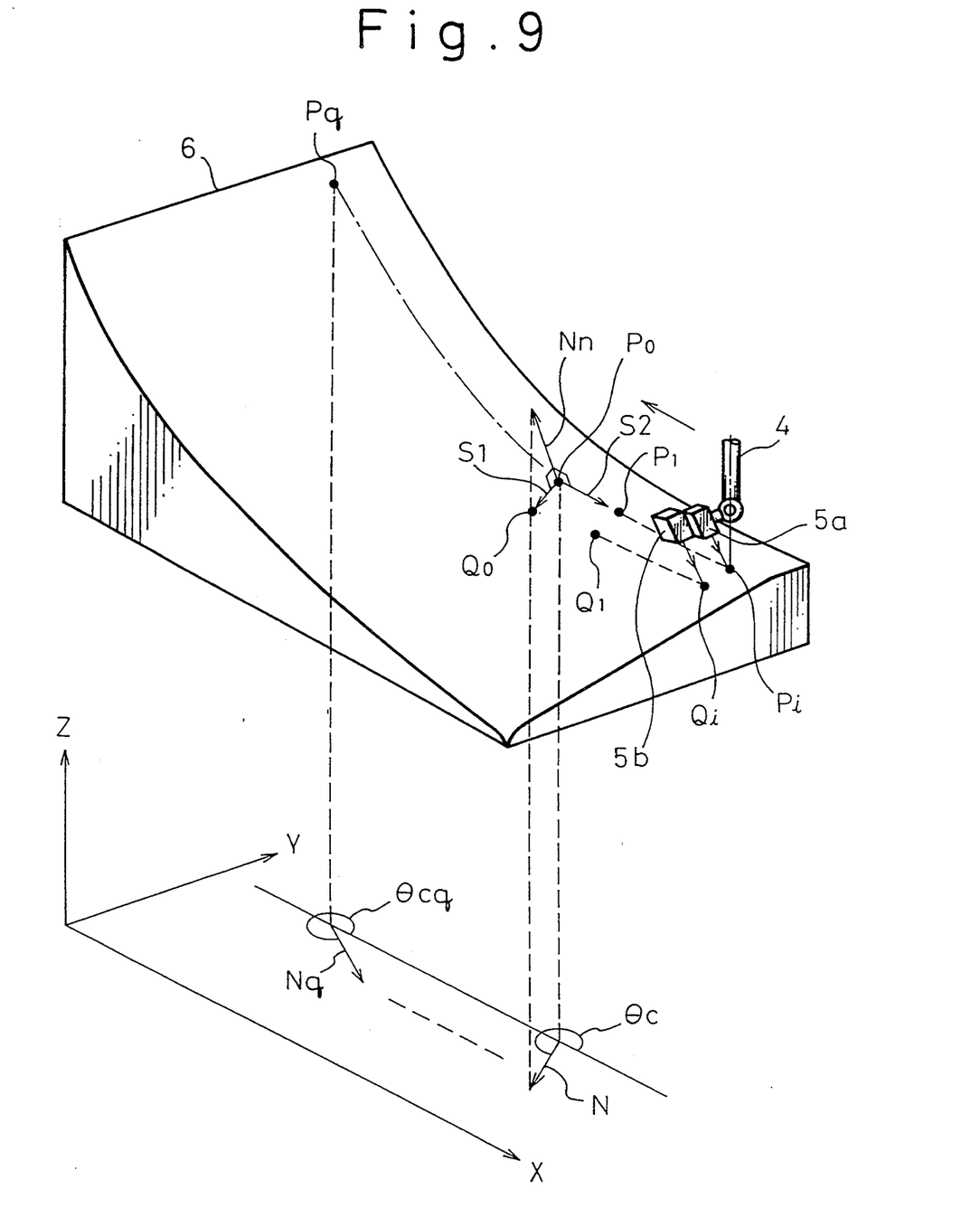
FIG. 9 is a explanatory drawing of a method for determining the rotation angle of the tracer head.

Next, the method for calculating the rotation angle of the tracer head 4 will be explained referring to FIG. 9. In FIG. 9, the measured data of the distance detectors 5a and 5b are periodically sampled with the determined interval while tracing the model 6 with the tracer head 4 and transferring relatively to the X-axis direction at the determined tracing speed. These measured data and the current position data output from the current position register are stored in the memory means 101; and the point Pi and Qi of the coordinates on the model 6 are calculated based on the stored data.

Then, from the 3 points composing the most similar triangle selected by the point selecting means 102, for example, from the coordinates $(X_0, Y_0, Z_0)$ of the measurement point $P_0$ and the coordinates $(X_1, Y_1, Z_1)$ of the measurement point $Q_0$, the surface vector S1 $(X_1-X_0, Y_1-Y_0, Z_1-Z_0)$ is calculated. And also from the coordinates $(X_0, Y_0, Z_0)$ of the measurement point $P_0$ and the coordinates $(X_2, Y_2, Z_2)$ of the measurement point P1, the surface vector S2 $(X_2-X_0, Y_2-Y_0, Z_2-Z_0)$ is calculated.

Then, by the following formula;

Nn=S1×S2

(where Nn, S1 and S2 represent vector)

The normal vector Nn at the point Pn may be calculated as a result of the vector product of the surface vector S1 and S2.

And the angle θc to the X-axis of the projection N of the normal vector Nn shadowed to an X-Y plane can be given the following formula;

$\theta c = \tan^{-1}(Jn/In)$ where In: X element of vector N,

Jn: Y element of vector N are determined, then output the angle θc as a command value for the C axis.

This angle changes corresponding to the slope angle of the model 6, for example, the point Pq becomes θcq.

Accordingly, since the tracer head 4 is controlled to direct the measurement axis of the distance detector as close to normal to the surface of the model 6 as possible even if the change rate of the curved surface is large, 3 points composing the most similar regular triangle can be selected and a high accuracy measurement of the distance can be obtained.

In the above described explanation, the tracer control unit has been explained, but the digitizing control unit can also obtain the same result.

And as a distance detector the optical triangulation type, eddy current type, ultrasonic type or others can be used instead of the optical reflection type.

It goes without saying that other modifications and variations may be effected without departing from the spirit and scope of the novel concepts of the invention.

As above explained, according to the present invention the accurate normal vector can be calculated even if the change ratio of the curve surface of the model is large, because the 3 points composing a triangle that is most similar to the regular triangle are selected when determining the normal vector by selecting 3 arbitrary points from the coordinates of a plurality of sampled points by a non-contact detector.

This is, since a high accuracy distance measurement can be obtained by always directing the measurement axis as close to normal to the model surface as possible so that the tracing accuracy of the digitizing control unit can be easily improved.

INDUSTRIAL APPLICABILITY

This invention is utilized for a non-contact digitizing control unit or a non-contact tracer control unit.

Furthermore this invention can also be utilized as a product contour checker during the process of manufacturing to discriminate bad products for quality control.

We claim:

1. Non-contact digitizing control unit obtaining tracing data by sampling coordinates of a plurality of points (Pi, Qi) from a model surface by means of a non-contact distance detecting means (105) of which attitude is controlled and directed to the most appropriate direction to the model surface, characterized in that it comprises, a memory means (101) for memorizing coordinates of the sampled plurality of points, a point selecting means (102) for selecting 3 points to compose a triangle most similar to a regular triangle from triangles composed of 3 arbitrary points of said coordinates, a vector determining means (103) for determining a normal vector on the model surface based on said coordinates of 3 points selected by said point selecting means (102), and an attitude control means (104) for controlling attitudes of the non-contact distance detecting means (105) so as to direct the detecting means (105) to be normal to the model surface based on said normal vector.

2. Non-contact digitizing control unit as claimed in claim 1, wherein said point selecting means (102) selects 3 points so as to maximize the ratio (SUM/MAX); the ratio that is the sum (SUM) of each side of each of the triangles divided by the maximum length (MAX) of the 3 sides of the triangle.

3. Non-contact digitizing control unit as claimed in claim 2, wherein said point selecting means (102) selects a current measurement point of said non-contact distance detector as an apex of a triangle.

4. Non-contact digitizing control unit as claimed in claim 3, wherein said point selecting means (102) allows the number of the measurement points (Qi) to be set at an arbitrary number.

5. Non-contact digitizing control unit as claimed in any one of the claims 2 to 4, wherein a plurality of non-contact detectors in said non-contact distance detecting means (105) are respectively mounted on a tracer head with a determined slope angle to a determined direct axis, and obtains tracing data by sampling coordinates of a plurality of points from said model surface simultaneously by controlling the position and the attitude of the tracer head to rotate around said direct axis.

6. Non-contact digitizing control unit as claimed in claim 5, wherein said attitude control means (104) controls the point Pi at the sampling points (Pi, Qi) fixed during attitude control.

7. Non-contact digitizing control unit as claimed in claim 5, wherein said non-contact distance detecting means (105) comprises photo reflecting type detectors.

8. Non-contact digitizing control unit as claimed in claim 5, wherein said non-contact distance detecting means (105) comprises photo detectors other than photo reflecting type detectors.

9. Non-contact digitizing control unit as claimed in claim 5, wherein said non-contact distance detecting means (105) comprises one of an eddy current type and as ultrasonic type detector.

* * * * *